US007039022B1

(12) United States Patent
Hedeås

(10) Patent No.: US 7,039,022 B1
(45) Date of Patent: May 2, 2006

(54) TRANSACTION SYSTEM

(75) Inventor: Urban Hedeås, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 908 days.

(21) Appl. No.: 09/715,717

(22) Filed: Nov. 16, 2000

(51) Int. Cl.
*H04B 7/00* (2006.01)
*H04M 11/00* (2006.01)

(52) U.S. Cl. ...................... 370/310; 370/313; 370/331; 370/328; 370/329; 455/406; 455/415

(58) Field of Classification Search ................ 370/310, 370/313, 331, 328, 329, 410; 455/406, 432.1, 455/438, 439
See application file for complete search history.

(56) References Cited

U.S. PATENT DOCUMENTS

| | | | | |
|---|---|---|---|---|
| 5,424,727 | A * | 6/1995 | Shieh | 340/928 |
| 5,920,818 | A | 7/1999 | Frodigh et al. | 455/443 |
| 5,937,019 | A * | 8/1999 | Padovani | 375/358 |
| 6,064,661 | A | 5/2000 | Benn | 370/329 |
| 6,064,885 | A | 5/2000 | Rouhollahzadeh et al. | 455/439 |
| 6,430,395 | B1 * | 8/2002 | Arazi et al. | 455/41.2 |
| 6,446,004 | B1 * | 9/2002 | Cao et al. | 701/213 |
| 6,522,880 | B1 * | 2/2003 | Verma et al. | 455/436 |
| 6,633,761 | B1 * | 10/2003 | Singhal et al. | 455/436 |
| 2001/0005840 | A1 * | 6/2001 | Verkama | 705/67 |
| 2004/0030601 | A1 * | 2/2004 | Pond et al. | 705/16 |

FOREIGN PATENT DOCUMENTS

| | | | |
|---|---|---|---|
| EP | 0 564 512 | B1 | 1/1998 |
| EP | 0564512 | B1 | 1/1998 |
| EP | 0967819 | A2 | 12/1999 |
| EP | 0 967 819 | A2 | 12/2000 |
| FR | 2793101 | A1 | 11/2000 |
| WO | WO 98/18105 | | 4/1998 |
| WO | WO 00/11616 | | 3/2000 |
| WO | WO 01/45319 | A1 | 6/2001 |

OTHER PUBLICATIONS

"Safisfying an Inquiry Connection to a Mobile Bluetooth Device", 437056, Research Disclosure, Sep. 2000, p. 1596.
European Patent Office Standard Search Report; File No. RS 106206; Oct. 19, 2001; pp. 1-4.
"Satisfying an Inquiry Connection to a Mobile Bluetooth Device," *Research Disclosure*, Sep. 2000, p. 1596, Disclosed anonymously, 437056.

* cited by examiner

*Primary Examiner*—Huy D. Vu
*Assistant Examiner*—Cynthia L. Davis

(57) ABSTRACT

A system and method for obtaining payment for a ticket for a transportation system from a wireless mobile terminal is disclosed. Upon entering of a wireless mobile terminal into a first coverage area of a transportation system at least one access unit establishes a first wireless connection with the wireless mobile terminal in order to obtain connection data for the wireless mobile terminal. The connection data is forwarded to at least one second access unit wherein responsive to the connection data and entry of the wireless mobile terminal into a second coverage area, a second connection is established with the at least one second access unit. Payment may then be obtained from the wireless mobile terminal via the second wireless connection.

16 Claims, 5 Drawing Sheets

TRANSACTION SYSTEM

TECHNICAL FIELD

The present invention relates to billing systems, and more particularly, to billing systems for use in public transportation facilities such as bus stations, train stations or subway stations.

BACKGROUND OF THE INVENTION

The use of mobile terminals (mobile telephones, portable computers, PDA's, pagers, etc.) as payment tools is becoming an increasingly developed area in the wireless communications art. Mobile terminals can be used to pay for purchases within a store or for the payment of services. One area in which a mobile terminal would prove useful for the payment of services is in the public transportation area. A user could pay for a bus or train token at the bus or train station using their mobile terminal.

One problem with mobile terminal payment methodologies is the time that it takes for a user's mobile terminal to connect with a wireless system. A certain period of time is required to establish a wireless connection. This could potentially require a user to stand in one location for a period of time which is unacceptable. In order for a system of this type to prove effective, a user must be able to walk directly through the bus or train station without stopping for any period of time in order for their mobile terminal to connect with the wireless system. Therefore, a system is needed enabling a user to connect to a wireless unit within a train, subway or bus station in substantially real time such that no delays are required.

SUMMARY OF THE INVENTION

The present invention overcomes the foregoing and other problems with a system and method for obtaining payment for a ticket for a transportation system from a wireless mobile terminal. In a first embodiment, a wireless mobile terminal establishes a first connection with a first access unit upon entry of the mobile terminal into a first coverage area of the transportation system. Connection data for the wireless mobile terminal is obtained by the first access unit and forwarded to a second access unit. Responsive to the connection data and entry of the wireless mobile terminal into a second coverage area associated with the second access unit, a second wireless connection is established with the second access unit. Payment data is then obtained from the wireless mobile terminal by the second access unit via the second wireless connection.

In an alternative embodiment, a first connection is established between a first access unit and the wireless mobile terminal upon entry of the wireless mobile terminal into a first coverage area of the transportation system. The connection data is forwarded to a second access unit which responsive to the connection data and entry of the wireless mobile terminal into a second coverage area, establishes a second connection with the wireless mobile terminal. The second access unit forwards the connection data to a third access unit associated with the second access unit which establishes a third wireless connection upon entry of the wireless mobile terminal into a third coverage area. The third access unit obtains payment data from the wireless mobile terminal via the third wireless connection.

BRIEF DESCRIPTION OF THE DRAWINGS

A more complete understanding of the method and apparatus of the present invention may be obtained by reference to the following Detailed Description when taken in conjunction with the accompanying Drawings wherein.

Figure 6:
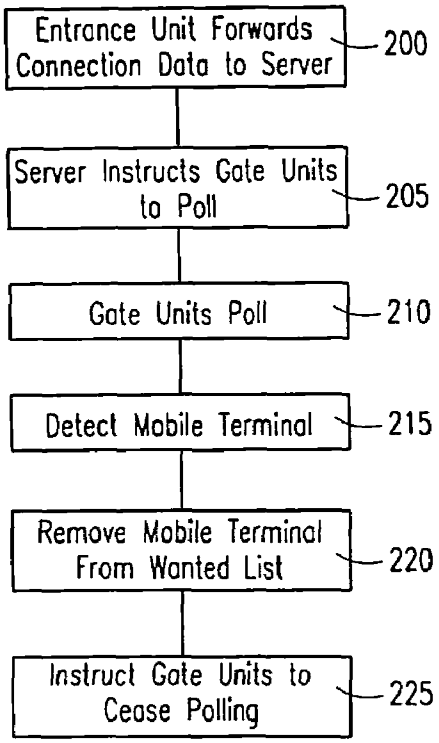

FIGS. **5*a* and 5*b*** illustrate the manner in which the entrance units and gate units may handoff data therebetween;

FIG. 6 is a flow diagram illustrating a data transfer between an entrance unit and a gate unit configuration as illustrated in FIG. **5*a*;**

Figure 7:
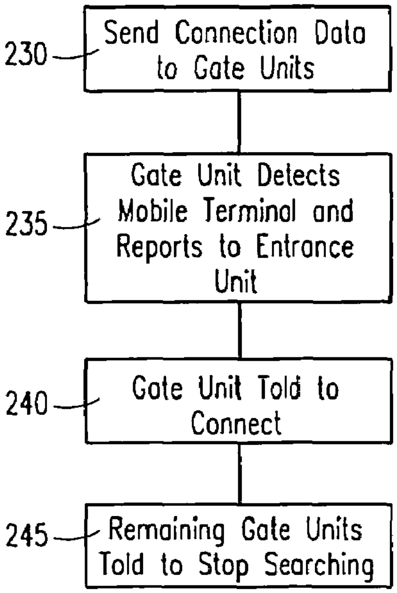
Figure 8:
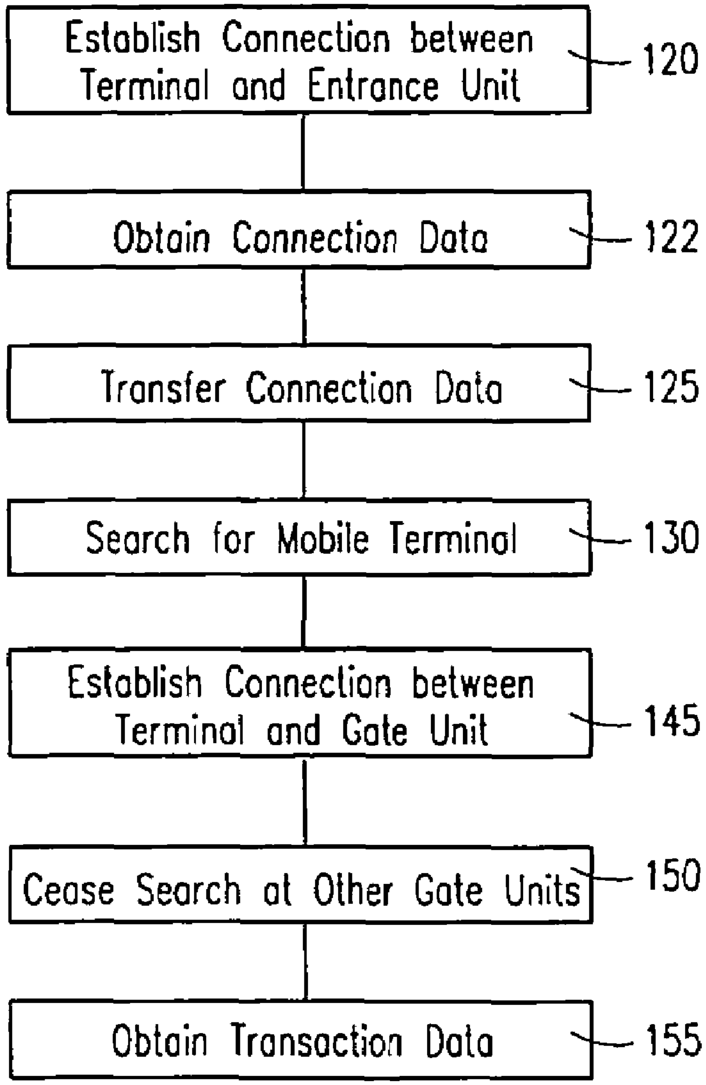

FIG. 7 is a flow diagram illustrating the transfer of data between an entrance unit and a gate unit configuration as illustrated in FIG. **5*b*; and FIG. 8** is a flow diagram generally illustrating the operation of the system of the present invention.

DETAILED DESCRIPTION

Figure 1:
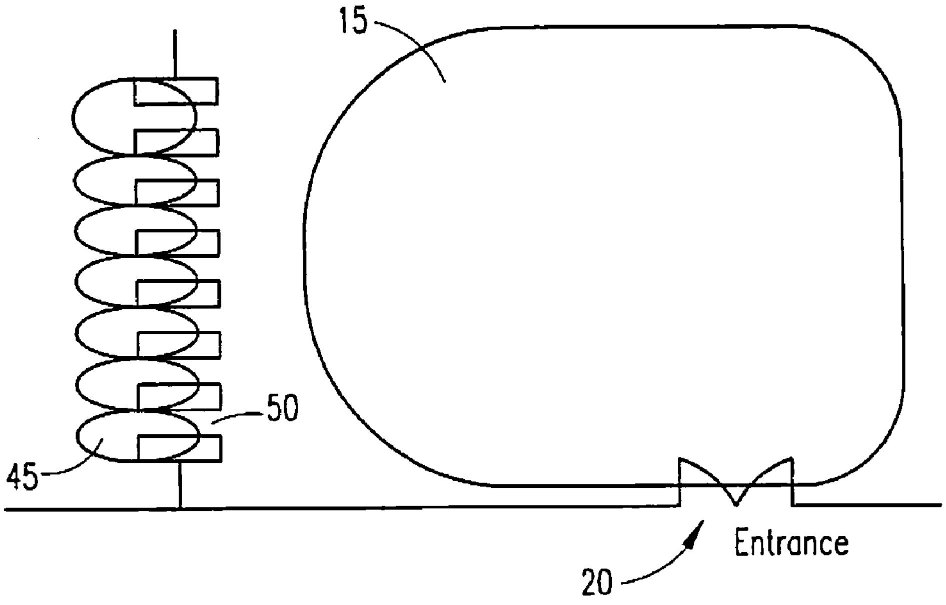
FIG. 1 illustrates the ticket payment system of the present invention.
Figure 2:
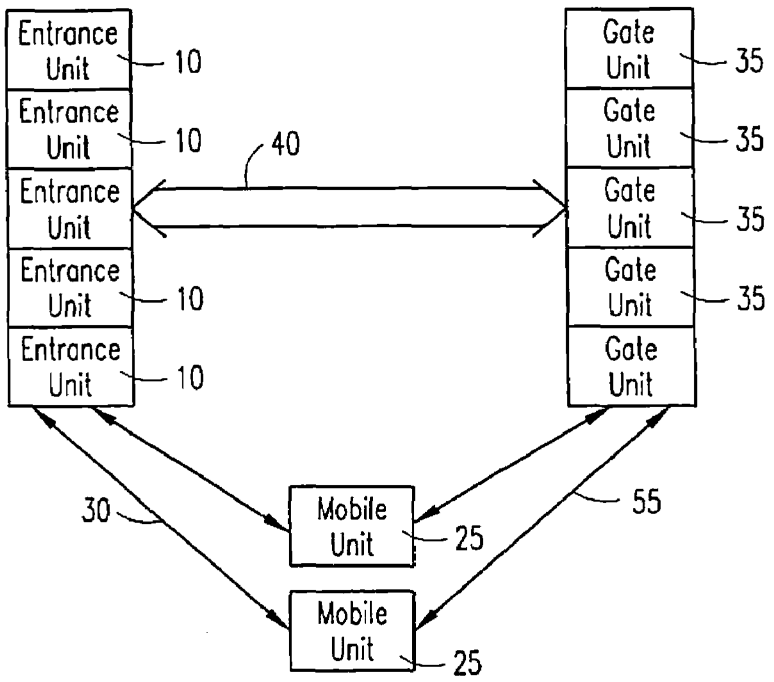
FIG. 2 is a block diagram illustrating the interconnections of the entrance units and gate units of the present invention.

Referring now to the drawings, and more particularly to FIGS. 1 and 2, there is illustrated a first embodiment of the ticket payment system of the present invention. While the present invention is described with respect to a ticket payment system, the invention may also be applied to other systems wherein data may be obtained from a mobile terminal via a short range wireless system such as Bluetooth (verification of ticket possession, verification of passport or other ID, etc.). The system comprises one or more entrance units 10 providing a coverage area 15 for monitoring the entrances 20 of a bus, train or subway (transportation) station. As the user passes through the coverage area 15 provided by the entrance units 10, a mobile terminal 25 carried by a user establishes a wireless communication link 30 with one of the entrance units 10. The mobile terminal 25 comprises a mobile telephone, portable computer, pager, PDA, etc. The coverage area 15 provided by the entrance units 10 is of large enough size such that sufficient time exists to establish a connection no matter at what speed the user may be traveling.

Once the wireless connection 30 has been established between the entrance unit 10 and the mobile terminal 25, connection data (i.e., frequency hop scheme, device address, clock-offset, etc.) may be transferred to the gate units 35 via a backbone network or dedicated wireless channel 40 between the entrance units 10 and the gate units 35. In a preferred embodiment, the entrance units 10 and gate units 35 of the present invention utilize the Bluetooth communications protocol in order to establish communications between the entrance unit 10, gate units 35 and mobile terminals 25. The communications between the entrance unit 10 and gate units 35 may also be via the Bluetooth protocol. By using the Bluetooth standard, multiple fixed entrance units 10 and gate units 35 may be interconnected via a central server as will be discussed more fully in moment. Each mobile terminal 25 can be connected to a single Bluetooth access unit and maintains that connection until the coverage area becomes too poor for communication.

The gate units 35 each have their own coverage area 45 located around a particular access gate 50 to the transportation system. Each of the gate units 35 searches for the mobile unit 25 using the Bluetooth Paging Procedure. Once one of the gate units 35 establishes a connection 55 with the mobile unit 25, the other gate units 35 cease paging for the mobile unit 25. Since an initial connection and synchronization with the mobile unit 25 need not be set up with the gate units 35 due to the connection information provided by the entrance units 10, a much shorter connection establishment period is required, and transaction data 61 for purchasing a ticket may be quickly retrieved from the mobile unit 25.

Figure 3:
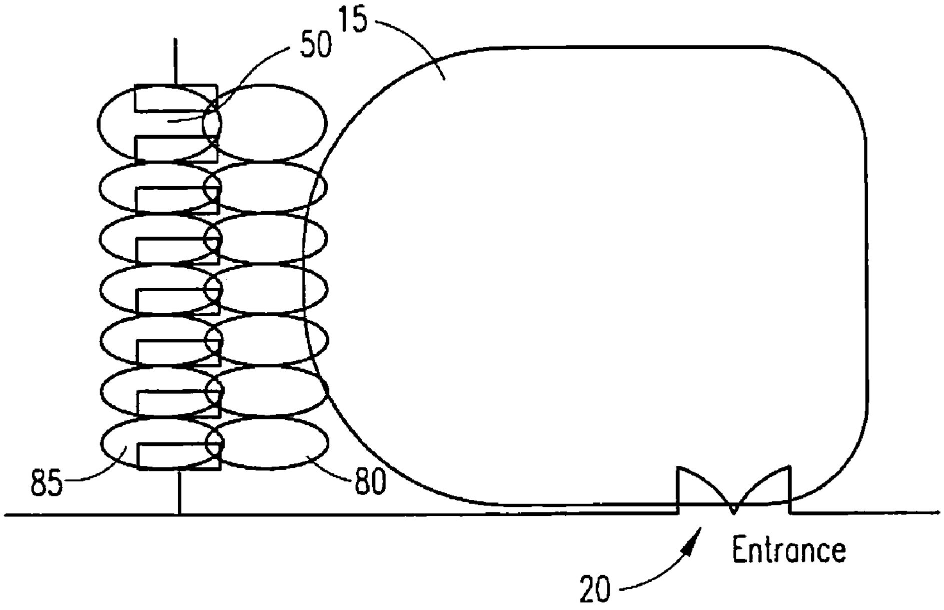
FIG. 3 illustrates an alternative embodiment of the ticket payment system of the present invention.
Figure 4:
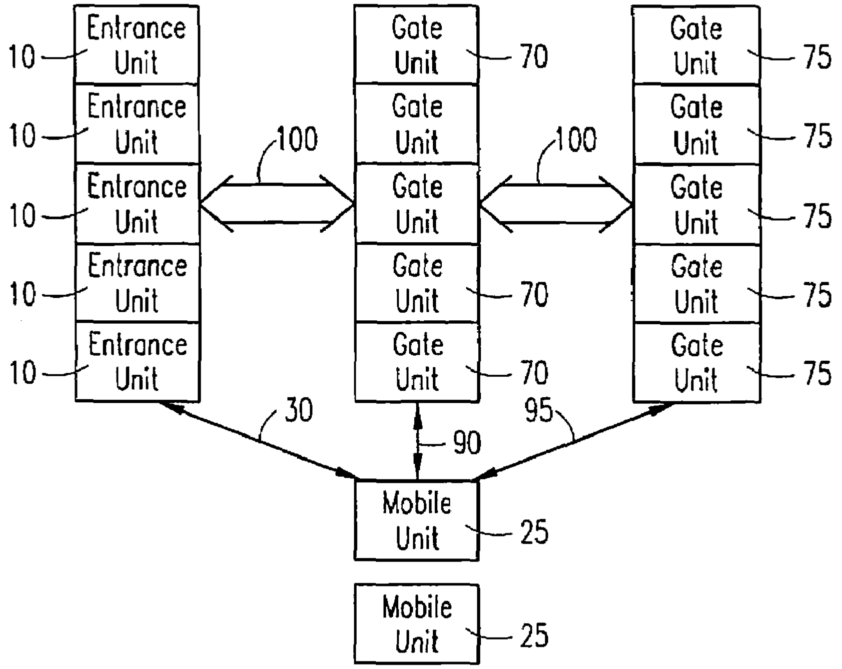
FIG. 4 is a block diagram illustrating the interconnection of the entrance units and the first and second stage gate units of the embodiment of FIG. 3.

Referring now to FIGS. 3 and 4, there is illustrated an alternative embodiment of the present invention wherein the gates 50 are covered by a first stage of gate units 70 and a second stage of gate units 75. As before, the entrance units 10 provide a first coverage area 15 for establishing an initial connection with a mobile terminal 25 once a user passes through an entrance 20 of a transportation station. The entrance unit 10 establishes a wireless connection 30 with the mobile unit 25 as was previously described with respect to FIGS. 1 and 2. Once this connection 30 is established, the connection data (i.e., frequency hop scheme, device address, clock-offset) is forwarded to the first stage gate units 70 via the backbone network or wireless connection 100. In a preferred embodiment, the entrance units 10 and gate units 35 of the present invention utilize the Bluetooth communications protocol in order to establish communications between the entrance unit 10, gate units 35 and mobile terminals 25. The communications between the entrance unit 10 and gate units 35 may also be via the Bluetooth protocol. By using the Bluetooth standard, multiple fixed entrance units 10 and gate units 35 may be interconnected via a central server as will be discussed more fully in moment. Each mobile terminal 25 can be connected to a single Bluetooth access unit and maintain that connection until the coverage area becomes too poor for communication.

The first stage gate units 70 page for the mobile terminal 25 until one of the gate units 70 establishes a connection. Once one of the gate units 70, for example, gate unit 70*a*, establishes a wireless connection 90 with the mobile terminal 25, the mobile terminal 25 is removed from a wanted list, and the connection data is forwarded to the second stage gate 75*a* specifically associated with the first stage gate 70*a* that has detected the mobile unit 25. The first stage gate units 70 then cease paging for the mobile terminal 25. The second stage unit 75*a* establishes a wireless connection 95 with the mobile unit 25 using the provided connection data and obtains the transaction data 61 necessary to pay for a ticket or token on the bus, train or subway.

In yet a further embodiment of the system illustrated in FIGS. 3 and 4, each first stage gate unit 70 and second stage gate unit 75 may be co-located or closely located. The first stage unit 70 may comprise a 100 mW Bluetooth unit and the second stage unit 75 may comprise one or more 1 mW units. The 100 mW first stage unit 70 would search for new Bluetooth mobile terminal 25 and once a suitable terminal 25 was within range, the connection would be passed from the 100 mW to the 1 mW unit.

Figure 5A:
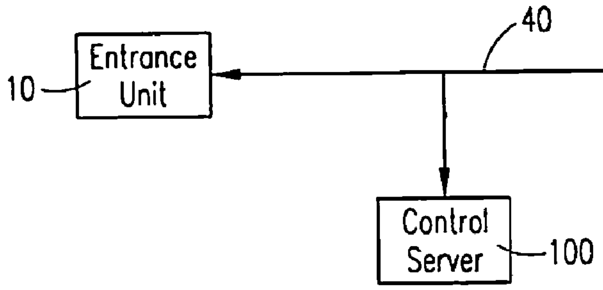
Figure 5B:
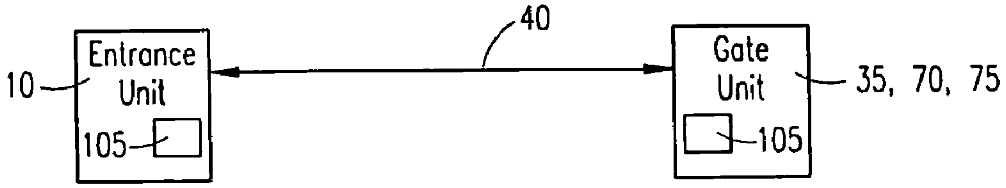

Referring now to FIGS. 5*a* and 5*b*, there are illustrated first and second embodiments of the manner in which the interface between the entrance units 10 and gate units 35, 70, 75 may be controlled. In the first embodiment of FIG. 5*a*, the entrance units 10 and gate units 35, 70, 75 are interconnected with a central server 100 via the backbone network or wireless connection 40 discussed previously with respect to FIGS. 1–4. In this embodiment, the central server 100 controls the transmission of the connection data between the entrance units 10 and gate units 35, 70, 75. The information may be transmitted via a wireline bus or using a dedicated Bluetooth channel or other type of wireless communications channel. Central server 100 acts as an information hub and controls the transfer of information between the access units via signals transmitted over the backbone network or dedicated communications channel 40. The central server 100 may use implementations such as the Bluetooth Solution Provider Kit in order to provide communications between the access units.

The transmissions between the entrance units 10 and gate units (30, 70, 75) may, in one embodiment, be solved by solutions such as dedicated bluetooth server or other centralized techniques. In this configuration, the control server 100 acts as an information hub and controls the access units. A dedicated bluetooth server has a database and functionality to connect with several Bluetooth access units and external computer systems. In the flowchart illustrated in FIG. 6, an entrance unit 10 sends at step 200 connection information to a control server 100, which may be a dedicated bluetooth server, of the detected mobile terminal 25. The control server 100 instructs at step 205 the gate units (30, 70, 75) to begin polling for the mobile terminal at step 205. The gate units begin polling at step 210 for the mobile terminal 25. A gate unit (30, 70, 75) detects at step 215 the mobile terminal 25 and reports this information back to control server 100. The control server 100 removes at step 220 the detected mobile terminal 25 from a "wanted list" of mobile terminals which are being polled for and instructs at step 225 the gate units (30, 70, 75) to cease polling for the mobile terminal 45.

In an alternative embodiment, the quality of connection between a mobile terminal 25 and a gate unit (30, 70, 75) may be utilized. When a gate unit (35, 70, 75) contacts a mobile terminal 25, the gate unit (35, 70, 75) performs a short sequence of test communications to gather information on signal strength or error rate. One manner in which handovers between entrance units 10 and gate units (35, 70, 75) may be controlled is by measuring the signal strength of radio signals between an access unit and a mobile terminal 25. When radio signal strengths reach certain levels, handovers may then occur. However, it is not always convenient to have signal strength information communicated between different units within a system. An alternative method utilizes a record of retransmission packets (erroneous packets) over a wireless communications link and basing handoff decisions on this information. The signal strength or erroneous packet information is forwarded to the control server 100 and the connection between the connected gate units (35, 70, 75) and the mobile terminal 25 is shut down. When a number of gate units (35, 70, 75) report the information on signal strength or error rate to the control server 100 in a short time period, the control server 100 decides which gate unit (35, 70, 75) should serve the mobile terminal 25 and transmits the order to the determined gate unit (35, 70, 75).

In the embodiment described in FIG. 5*b*, the entrance units 10 and gate units 35, 70, 75 further include control logic 105 enabling them to autonomously negotiate with each other about which access unit shall control a specific mobile unit 25. Referring now also to FIG. 7, there is illustrated the process wherein information is transmitted between the entrance unit 10 and gate units 35, 70, 75 when control logic 105 is implemented within each access unit as shown in FIG. 5*b*. When the entrance unit 10 is ready to hand over a mobile terminal 25, entrance unit 10 sends at step 230 connection data to the gate units (35, 70, 75). When a gate unit (30, 70, 75) detects the mobile terminal 25, this information is reported back to the entrance unit 10 at step 235. The entrance unit 10 removes the mobile terminal 25 from a "wanted list" of mobile terminals and instructs the gate unit (35, 70, 75) at step 240 to connect with the mobile terminal 25. The entrance unit 10 also instructs the remainder of the gate units (35, 70, 75) to cease searching for the mobile terminal at step 245. Alternatively, the quality of connection procedure described previously with respect to FIG. 6 may also be used in transferring information between the entrance unit 10 and gates (35, 70, 75). In this process, the entrance unit 10 would act as the control server 10 during the process.

Situations may occur where a mobile terminal 25 is dropped from its connection due to various events, for example, the user of the mobile terminal may travel to a gate unit other than the expected gate unit, the mobile terminal may lose coverage, the user may leave the transportation station, etc. The default behavior in these scenarios would be for the gate units (35, 70, 75) to report the loss of the mobile terminal 25 to the control server 100 or access unit containing control logic 105. The entrance unit 10 would be able to reconnect with the mobile terminal 25 again when it enters its coverage area.

Referring now to FIG. 8, there is illustrated a flow diagram describing the operation of the system of the present invention. Initially, a connection is established between the mobile terminal and the entrance unit at step 120. Connection data is obtained at step 122 from the mobile terminal by the entrance unit. The entrance units transfer at step 125 the connection data to the gate units. The gate units begin searching at step 130 for the mobile terminal. Once the mobile terminal is located, a connection is established at step 145 with the mobile terminal, and the search may be ceased by the other gate units at step 150. The transaction data is provided to the gate unit which has detected the mobile unit at step 155, or alternatively, as described in the alternative embodiment of the invention, the connection data can be forwarded to an associated gate unit for completion of the transaction.

The previous description is of a preferred embodiment for implementing the invention, and the scope of the invention should not necessarily be limited by this description. The scope of the present invention is instead defined by the following claims.

What is claimed is:

1. An arrangement for obtaining payment data from a wireless mobile terminal, comprising:

- a short range wireless system comprising:
  - an access unit having a first coverage area for establishing an initial connection with the wireless mobile terminal; and
  - a payment extraction unit having a second coverage area for extracting payment from an account associated with the wireless mobile terminal, wherein the initial connection is transferred from the access unit to the payment extraction unit as the wireless mobile terminal moves from the first coverage area into the second coverage area and the payment extraction unit obtains payment data from the wireless mobile terminal; and
- a control server for transferring the wireless mobile terminals initial connection between the first coverage area and the second coverage area, wherein the control server comprises:
  - a database for storing information received from the access unit, the payment extraction unit and an intermediate unit, wherein the information received from the access unit includes, an address of the wireless mobile terminal, a clock offset and a frequency hop scheme; and
- means for connecting to and controlling the access unit, the payment extraction unit and an intermediate unit having a third coverage area;
- wherein the intermediate unit is a low power unit and the third coverage area overlaps both the first and second coverage areas, and when the wireless mobile terminal enters the third coverage area and the wireless mobile terminal initial connection is transferred to the intermediate unit, the intermediate unit notifies the control server of the transfer of the wireless mobile terminal initial connection and the control server notifies the payment extraction unit of the transfer and includes the wireless mobile terminal address.

2. The arrangement of claim 1, wherein the first coverage area is larger than the second coverage area.

3. The arrangement of claim 1, wherein the payment extraction unit is one of a plurality of payment extraction units wherein each payment extraction unit maintains a coverage area that will accept a transfer of the initial connection from the first coverage area.

4. The arrangement of claim 1, wherein the access unit and the payment extraction unit both utilize Bluetooth communications protocol.

5. The arrangement of claim 1, further comprises means for sending notification to the payment extraction unit from the control server when the wireless mobile terminal initial connection is transferred to the intermediate unit.

6. The arrangement of claim 1, wherein a connection establishment period between the payment extraction unit and the wireless mobile terminal is shortened by transferring the initial connection to the payment extraction unit and the time required for retrieving the payment data is minimized.

7. The arrangement of claim 1, wherein the payment data comprises verification data of a transportation system ticket.

8. The arrangement of claim 1, wherein the payment data comprises identification data of a user of the mobile terminal.

9. A method for obtaining payment data from a wireless mobile terminal, comprising the steps of:

- utilizing a short range wireless system for connecting to the wireless mobile terminal;
- establishing an initial connection between an access unit and the wireless mobile terminal in a first coverage area;
- transferring the initial connection from the access unit to a payment extraction unit having a second coverage area as the wireless mobile terminal moves from the first coverage area into the second coverage area, the payment extraction unit obtaining payment data from the wireless mobile terminal;
- extracting payment from an account associated with the wireless mobile terminal;
- transferring the wireless mobile terminal's initial connection between the first coverage area and the second coverage area;
- storing information received from the access-unit, the payment extraction unit and an intermediate unit, wherein the information received from the access unit includes, an address of the wireless mobile terminal, a clock offset and a frequency hop scheme;

connecting to and controlling the access unit the payment extraction unit and an intermediate unit having a third coverage area;

transferring the wireless mobile terminal to the intermediate unit when the wireless mobile terminal enters the third coverage area, wherein the intermediate unit is a low power unit and the third coverage area overlaps both the first and second coverage areas; and responsive to connecting with the wireless mobile unit, the intermediate unit notifying the control server of the transfer of the wireless mobile terminal's initial connection and the control server in turn notifying the payment extraction unit of the transfer and including the wireless mobile terminal address.

10. The method of claim 9, wherein the first coverage area is larger than the second coverage area.

11. The method of claim 9, wherein the payment extraction unit is one of a plurality of payment extraction units wherein each payment extraction unit maintains a coverage area that will accept a transfer of the initial connection from the first coverage area.

12. The method of claim 9, further comprising the access unit and the payment extraction unit both utilizing Bluetooth communications protocol.

13. The method of claim 9, further comprising:

sending notification to the payment extraction unit from the control server when the wireless mobile terminal's initial connection is transferred to the intermediate unit.

14. The method of claim 9, wherein transferring the initial connection to the payment extraction unit, a connection establishment period between the payment extraction unit and the wireless mobile terminal is shortened and the time required for retrieving the payment data is minimized.

15. The method of claim 9, wherein the payment data comprises verification data of a transportation system ticket.

16. The method of claim 9, wherein the payment data comprises identification data of a user of the mobile terminal.

* * * * *